US011102668B2

(12) United States Patent
Takahashi et al.

(10) Patent No.: US 11,102,668 B2
(45) Date of Patent: Aug. 24, 2021

(54) USER DEVICE AND MEASUREMENT REPORT TRANSMITTING METHOD (71) Applicant: NTT DOCOMO, INC., Tokyo (JP)

(72) Inventors: Hideaki Takahashi, Tokyo (JP); Kohei Kiyoshima, Tokyo (JP); Wuri Andarmawanti Hapsari, Tokyo (JP); Yuta Sagae, Tokyo (JP); Sadayuki Abeta, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/482,942

(22) PCT Filed: Jan. 31, 2018

(86) PCT No.: PCT/JP2018/003116
§ 371 (c)(1),
(2) Date: Aug. 1, 2019

(87) PCT Pub. No.: WO2018/143240
PCT Pub. Date: Aug. 9, 2018

(65) Prior Publication Data
US 2020/0015107 A1    Jan. 9, 2020

(30) Foreign Application Priority Data

Feb. 2, 2017    (JP) .............................. JP2017-017759

(51) Int. Cl.
*H04W 24/10*    (2009.01)
(52) U.S. Cl.
CPC .................................. *H04W 24/10* (2013.01)

(58) Field of Classification Search
CPC ................. H04W 24/10; H04W 48/16; H04W 36/00837; H04W 72/04; H04B 17/309
See application file for complete search history.

(56) References Cited

U.S. PATENT DOCUMENTS

| 2012/0015657 | A1  | 1/2012 | Comsa et al. |
| 2015/0271713 | A1* | 9/2015 | Kim ................. H04W 36/0069 455/437 |
| 2017/0064576 | A1  | 3/2017 | Kusashima et al. |
| 2017/0127330 | A1* | 5/2017 | Payyappilly ...... H04W 36/0061 |

(Continued)

FOREIGN PATENT DOCUMENTS

WO    2015/141829 A1    9/2015

OTHER PUBLICATIONS

International Search Report issued in PCT/JP2018/003116 dated Apr. 17, 2018 (1 page).

(Continued)

*Primary Examiner* — Kibrom T Hailu
(74) *Attorney, Agent, or Firm* — Osha Bergman Watanabe & Burton LLP (57) ABSTRACT Based on an entering condition for reporting reception quality of a cell via Measurement Report, UE (200) transmits to a radio access network the Measurement Report. The UE (200) judges numberOfTriggeringCell that triggers transmission of the measurement report to the radio access network, and transmits the Measurement Report when the number of neighbor cells that fulfill the entering condition is equal to or more than the numberOfTriggeringCell.

14 Claims, 8 Drawing Sheets

(56) References Cited

U.S. PATENT DOCUMENTS

2018/0332492 A1* 11/2018 Wang .................. H04B 17/309

OTHER PUBLICATIONS

Written Opinion of the International Searching Authority issued in PCT/JP2018/003116 dated Apr. 17, 2018 (3 pages).
3GPP TS 36.331 V14.0.0; "3rd Generation Partnership Project; Technical Specification Group Radio Access Network; Evolved Universal Terrestrial Radio Access (E-UTRA); Radio Resource Control (RRC); Protocol specification (Release 14)"; Sep. 2016 (643 pages).
3GPP TS 36.300 V14.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)"; Sep. 2017 (329 pages).
3GPP TS 36.331 V14.4.0; "3rd Generation Partnership Project; Technical Specification Group Radio Access Network; Evolved Universal Terrestrial Radio Access (E-UTRA); Radio Resource Control (RRC); Protocol specification (Release 14)"; Sep. 2017 (753 pages).
Extended European Search Report issued in counterpart European Patent Application No. 18748632.9, dated Oct. 5, 2020 (15 pages).
3GPP TS 36.331 V14.1.0; "3rd Generation Partnership Project; Technical Specification Group Radio Access Network; Evolved Universal Terrestrial Radio Access (E-UTRA); Radio Resource Control (RRC); Protocol specification (Release 14)"; Dec. 2016 (654 pages).
Office Action issued in European Application No. 18748632.9, dated Mar. 3, 2021 (13 pages).

\* cited by examiner

*ReportConfigEUTRA* information element

```
-- ASN1START

ReportConfigEUTRA ::=          SEQUENCE {
    triggerType                    CHOICE {
        event                          SEQUENCE {
            eventId                        CHOICE {
                eventA1                        SEQUENCE {
                    a1-Threshold                   ThresholdEUTRA
                },
                eventA2                        SEQUENCE {
                    a2-Threshold                   ThresholdEUTRA
                },
                eventA3                        SEQUENCE {
                    a3-Offset                      INTEGER (-30..30),
                    reportOnLeave                  BOOLEAN
                },
                eventA4                        SEQUENCE {
                    a4-Threshold                   ThresholdEUTRA
                },
                eventA5                        SEQUENCE {
                    a5-Threshold1                  ThresholdEUTRA,
                    a5-Threshold2                  ThresholdEUTRA
                },
                ...,
                eventA6-r10                    SEQUENCE {
                    a6-Offset-r10                  INTEGER (-30..30),
                    a6-ReportOnLeave-r10           BOOLEAN
```

```
        includeMultiBandInfo-r13       ENUMERATED {true}       OPTIONAL, -- Cond
reportCGI
        ul-DelayConfig-r13             UL-DelayConfig-r13      OPTIONAL  -- Need ON
    ]],
    [[ ue-RxTxTimeDiffPeriodical-TDDr13 BOOLEAN                OPTIONAL  -- Need ON
    ]],
    [[ numberOfTriggeringCell-r14      INTEGER(2..maxCellReport) OPTIONAL -- Need ON -
    ]]
}

RSRQ-RangeConfig-r12 ::=       CHOICE {
    release                        NULL,
    setup                          RSRQ-Range-v1250
}
ThresholdEUTRA ::=             CHOICE{
    threshold-RSRP                 RSRP-Range,
    threshold-RSRQ                 RSRQ-Range
}
ThresholdEUTRA-v1250::=        CSI-RSRP-Range-r12

MeasRSSI-ReportConfig-r13 ::= SEQUENCE {
    channelOccupancyThreshold-r13  RSSI-Range-r13          OPTIONAL    -- Need OR
}
-- ASN1START
```

FIG. 6

| ReportConfigEUTRA field descriptions |
|---|
| a3-Offset/ a6-Offset/ c2-Offset<br>Offset value to be used in EUTRA measurement report triggering condition for event a3/ a6/ c2. The actual value is field value * 0.5 dB. |
| alternativeTimeToTrigger<br>Indicates the time to trigger applicable for cells specified in *altTTT-CellsToAddModList* of the associated measurement object, if configured |
| aN-ThresholdM/ cN-ThresholdM<br>Threshold to be used in EUTRA measurement report triggering condition for event number aN/ cN. If multiple thresholds are defined for event number aN/ cN, the thresholds are differentiated by M. E-UTRAN configures *aN-Threshold1* only for events A1, A2, A4, A5 and *a5-Threshold2* only for event A5. |
| c1-ReportOnLeave/ c2-ReportOnLeave<br>Indicates whether or not the UE shall initiate the measurement reporting procedure when the leaving condition is met for a CSI-RS resource in *csi-RS-TriggeredList*, as specified in 5.5.4.1. |
| c2-RefCSI-RS<br>Identity of the CSI-RS resource from the *measCSI-RS-ToAddModList* of the associated *measObject*, to be used as the reference CSI-RS resource in EUTRA measurement report triggering condition for event c2. |
| channelOccupancyThreshold<br>RSSI threshold which is used for channel occupancy evaluation. |
| eventId<br>Choice of E-UTRA event triggered reporting criteria. EUTRAN may set this field to *eventC1* or *eventC2* only if *measDS-Config* is configured in the associated *measObject* with one or more CSI-RS resources. The *eventC1* and *eventC2* are not applicable for the *eventId* if RS-SINR is configured as *triggerQuantity* or *reportQuantity*. |
| includeMultiBandInfo<br>If this field is present, the UE shall acquire and include multi band information in the measurement report. |
| maxReportCells<br>Max number of cells, excluding the serving cell, to include in the measurement report concerning CRS, and max number of CSI-RS resources to include in the measurement report concerning CSI-RS. |
| measRSSI-ReportConfig<br>If this field is present, the UE shall perform measurement reporting for RSSI and channel occupancy and ignore the *triggerQuantity*, *reportQuantity* and *maxReportCells* fields. E-UTRAN only sets this field to *true* when setting *triggerType* to *periodical* and *purpose* to *reportStrongestCells*. |
| numberOfTriggeringCell<br>If the entering or leaving condition is fulfilled for the number of cells indicated by this field, measurement reporting is triggerd. This field is set only for the events where the condition is judged by comparing the serving cell and the neighbor cell, i.e. *eventA3*, *eventA5* and *eventA6*. The value of this field shal be smaller than the one of *maxReportCells*. |
| reportAmount<br>Number of measurement reports applicable for *triggerType event* as well as for *triggerType periodical*. In case *purpose* is set to *reportCGI* or *reportSSTD-Meas* is set to *true*, only value 1 applies. |
| reportCRS-Meas |

USER DEVICE AND MEASUREMENT REPORT TRANSMITTING METHOD

TECHNICAL FIELD

The present invention relates to a user device and a measurement report transmitting method capable of transmitting to a radio access network a measurement report of reception quality of a serving cell and a neighbor cell.

BACKGROUND ART

3rd Generation Partnership Project (3GPP) specifies Long Term Evolution (LTE), and with an aim of further speeding, specifies LTE-Advanced (hereinafter, it is assumed that the LTE includes the LTE-Advanced).

In the LTE, a user device (UE) can transmit to a radio access network (E-UTRAN), specifically, to a radio base station (eNB) Measurement Report that includes measurement results of reception quality (such as RSRP/RSRQ (Reference Signal Received Power/Reference Signal Received Quality)) of a serving cell (a cell in a connected state (RRC Connected) in a radio resource control (RRC) layer) and a neighbor cell that is formed near the serving cell (refer to Non-Patent Document 1).

In such Measurement Reporting, events (A3, A5, and A6) for comparing the reception quality of the serving cell and the reception quality of the neighbor cell are stipulated. When an entering condition stipulated for each event, that is, a condition based on which it is judged whether to report reception quality of a cell via a measurement report to be transmitted to the radio access network is fulfilled, the UE transmits to the eNB the Measurement Report that includes that measurement report.

Moreover, even when the entering condition of the event is no longer being fulfilled (that is, when a leaving condition is being fulfilled) after the entering condition of that event was fulfilled, the UE can transmit to the eNB the Measurement Report.

PRIOR ART DOCUMENT

Non-Patent Document

Non-Patent Document 1: 3GPP TS 36.331 V14.0.0 Subclause 6.3.5 Measurement information elements, 3rd Generation Partnership Project; Technical Specification Group Radio Access Network; Evolved Universal Terrestrial Radio Access (E-UTRA); Radio Resource Control (RRC); Protocol specification (Release 14), 3GPP, September 2016

SUMMARY OF THE INVENTION

Problem to be Solved by the Invention

Recently, UEs are being mounted on small-sized unmanned flying objects such as drones. Because such mounted UEs fly in the sky above the eNBs (cells), unlike the ordinary UEs, these UEs are less susceptible to receive impact from barriers such as buildings, and an unobstructed propagation environment is easily obtainable. In other words, this means that such UEs can easily cause interference to several neighbor cells other than a serving cell (own cell).

To solve this problem, a mechanism of the Measurement Reporting explained above can be utilized to detect the interference at the radio access network side and implement appropriate measures such as handover to another cell. In the existing Measurement Reporting, a plurality of the measurement reports of a plurality of the neighbor cells that fulfills the entering condition can be transmitted simultaneously.

However, in the existing Measurement Reporting, the Measurement Reporting is triggered even when one neighbor cell fulfills the entering condition (or a leaving condition). Therefore, in the UE that is mounted on the drone in which the unobstructed propagation environment is easily obtainable, high possibility of the frequent triggering of the Measurement Reporting and significant consumption of radio resources till the measurement reports of the plurality of the neighbor cells that fulfills the entering condition, which are being awaited by the radio access network, are acquired becomes a concern.

Therefore, the present invention has been made in view of the above circumstances. One object of the present invention is to provide a user device and a measurement report transmitting method capable of realizing an appropriate measurement reporting that suppresses the consumption of the radio resources even when the user device is mounted on a drone and the like, and an unobstructed propagation environment is easily obtainable.

A user device according to one aspect of the present invention transmits to a radio access network a measurement report that includes reception quality of a serving cell and reception quality of a neighbor cell. The user device includes a measurement report transmitting unit that transmits to the radio access network the measurement report based on an entering condition for reporting the reception quality of a cell via the measurement report; and a cell count judging unit that judges the number of triggering cells that trigger the transmission of the measurement report to the radio access network. When the number of the neighbor cells that fulfill the entering condition is equal to or more than the number of the triggering cells, the measurement report transmitting unit transmits the measurement report.

A measurement report transmitting method according to another aspect of the present invention transmits a measurement report that includes reception quality of a serving cell and reception quality of a neighbor cell to a radio access network. The measurement report transmitting method includes transmitting including transmitting to the radio access network the measurement report based on an entering condition for reporting the reception quality of a cell via the measurement report, and judging including judging the number of triggering cells that trigger the transmission of the measurement report to the radio access network. The transmitting includes transmitting the measurement report when the number of the neighbor cells that fulfill the entering condition is equal to or more than the number of the triggering cells.

BRIEF DESCRIPTION OF DRAWINGS

FIG. 6 is a diagram showing a field explanation (a part) of the ReportConfigEUTRA.

MODES FOR CARRYING OUT THE INVENTION

Exemplary embodiments of the present invention are explained below with reference to the accompanying drawings. In the drawings, structural elements having the same function or configuration are indicated by the same or similar reference numerals and the explanation thereof is appropriately omitted.

(1) Overall Structural Configuration of Radio Communication System

Figure 1:
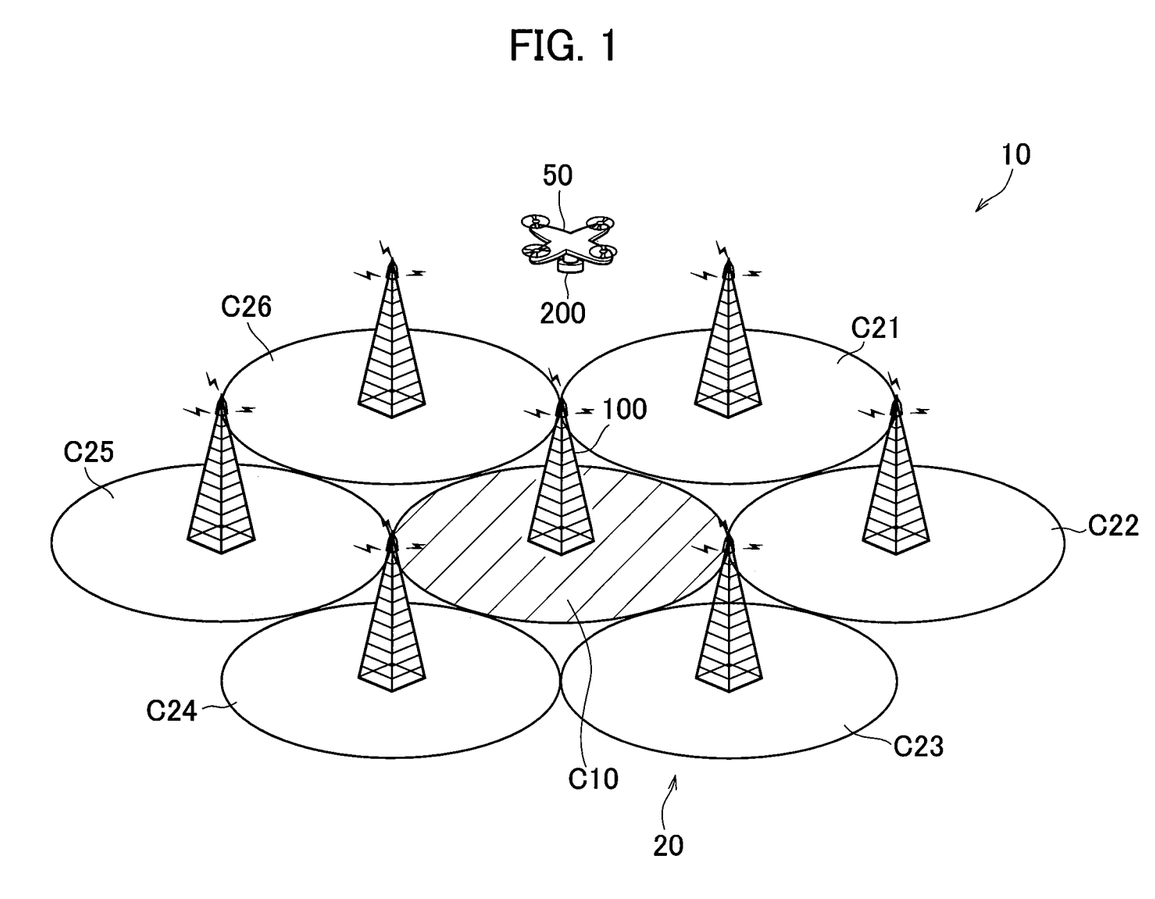
FIG. 1 is an overall structural diagram of a radio communication system 10.

FIG. 1 is an overall structural diagram of a radio communication system 10 according to the present embodiment. The radio communication system 10 is a radio communication system using the Long Term Evolution (LTE), and includes a radio access network 20 and a mobile station 200 (hereinafter, "UE 200").

The radio access network 20 is an Evolved Universal Terrestrial Radio Access Network (E-UTRAN) stipulated in the 3GPP, and includes a radio base station 100 (hereinafter, "eNB 100"). However, the radio communication system 10 is not necessarily limited to the LTE (E-UTRAN). For example, the radio access network 20 can be a radio access network that includes a radio base station that performs radio communication with the UE 200 (user device) that is stipulated as 5G.

The eNB 100 and the UE 200 perform radio communication using the LTE. Particularly, in the present embodiment, a plurality of the eNBs 100 forms cell C10, and cells C21 to C26. The UE 200 is mounted on a small-sized unmanned flying object such as a drone 50.

In the present embodiment, the UE 200 uses the cell C10 as a serving cell. In other words, the cells C21 to C26 are formed near the cell C10, which is the serving cell. However, the serving cell can be called PCell or PSCell (in the case of Dual Connectivity).

Moreover, the UE 200 transmits to the radio access network 20 Measurement Report that includes reception quality (such as RSRP/RSRQ) of the serving cell and a neighbor cell.

(2) Functional Block Configuration of Radio Communication System

A functional block configuration of the radio communication system 10 is explained below. Specifically, a functional block configuration of the UE 200 is explained below.

Figure 2:
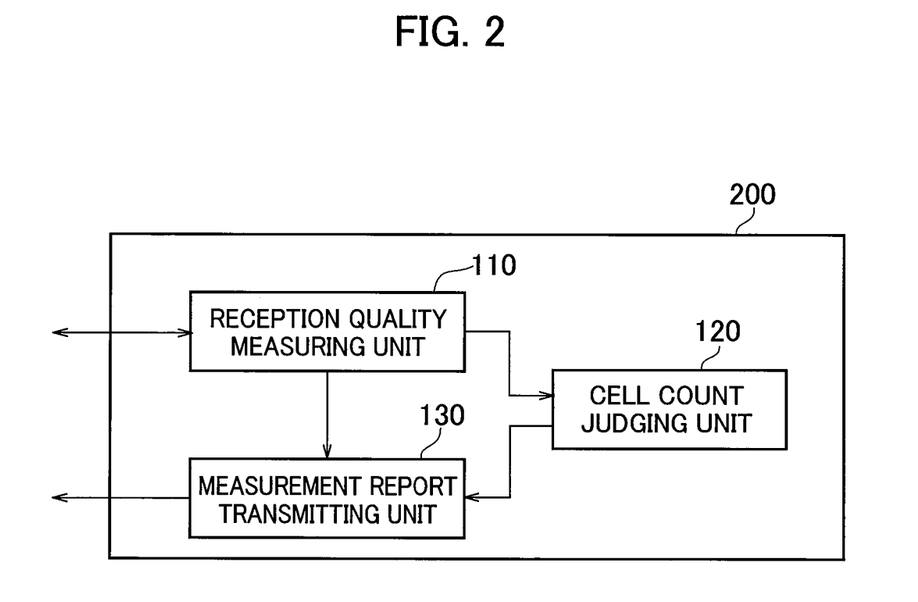
FIG. 2 is a functional block diagram of UE 200.

FIG. 2 is a functional block diagram of the UE 200. As shown in FIG. 2, the UE 200 includes a reception quality measuring unit 110, a cell count judging unit 120, and a measurement report transmitting unit 130.

The reception quality measuring unit 110 measures the reception quality of the serving cell and the neighbor cell of the UE 200. Specifically, the reception quality measuring unit 110 measures, according to a measurement configuration (MeasConfig) of the reception quality that is notified from the radio access network 20, the reception quality such as the RSRP/RSRQ of the serving cell and the neighbor cell.

The cell count judging unit 120 judges the number of triggering cells that trigger the transmission of the Measurement Report to the radio access network 20.

Specifically, the cell count judging unit 120 receives from the radio access network 20 an information element (IE) ReportConfigEUTRA that stipulates the transmission triggering condition. The ReportConfigEUTRA is included in RRC Connection Reconfiguration. The ReportConfigEUTRA includes a field of numberOfTriggeringCell that indicates the number of the triggering cells.

The number of the triggering cells (numberOfTriggeringCell) is determined according to whether an entering condition or a leaving condition based on a comparison between the reception quality of the serving cell and the reception quality of the neighbor cell is fulfilled. The entering condition stipulates whether to report the reception quality of a cell via the Measurement Report. The leaving condition stipulates whether to omit the reception quality of a cell from the Measurement Report.

Specifically, the numberOfTriggeringCell is determined based on the entering condition or the leaving condition of events A3, A5, and A6 stipulated in Chapter 6.3.5 of 3GPP TS36.331. The events A3, A5, and A6 are stipulated as follows.

Event A3: Neighbor becomes amount of offset better than PCell/PSCell

Event A5: PCell/PSCell becomes worse than absolute threshold1 AND Neighbour becomes better than another absolute threshold2

Event A6: Neighbour becomes amount of offset better than SCell

Moreover, the numberOfTriggeringCell is set to a value smaller than the maximum number of cells that can be reported (maxReportCells) via the Measurement Report.

The measurement report transmitting unit 130 transmits to the radio access network 20 the Measurement Report. Specifically, the measurement report transmitting unit 130 transmits to the radio access network 20 the Measurement Report based on the entering condition for reporting the reception quality of a cell via the Measurement Report. When a neighbor cell fulfills the entering condition, the measurement report transmitting unit 130 transmits the Measurement Report that includes the reception quality of that cell.

When the number of the neighbor cells that fulfill the entering condition is equal to or more than the number of the triggering cells (numberOfTriggeringCell), the measurement report transmitting unit 130 can transmit the Measurement Report.

Moreover, when the number of the neighbor cells that fulfill the leaving condition for omitting the reception quality of a cell from the Measurement Report is equal to or more than the number of the triggering cells, the measurement report transmitting unit 130 can transmit the Measurement Report. When a neighbor cell fulfills the leaving condition, the measurement report transmitting unit 130 omits the reception quality of that cell from the Measurement Report because the cell could not fulfill the condition of the event, and then transmits the Measurement Report.

(3) Operation of Radio Communication System

Operation of the radio communication system 10 is explained below. Specifically, a measurement report transmission operation performed by the UE 200 will be explained. As explained above, in the present embodiment, the UE 200 is mounted on the drone 50, and an unobstructed propagation environment is easily obtainable.

Figure 3:
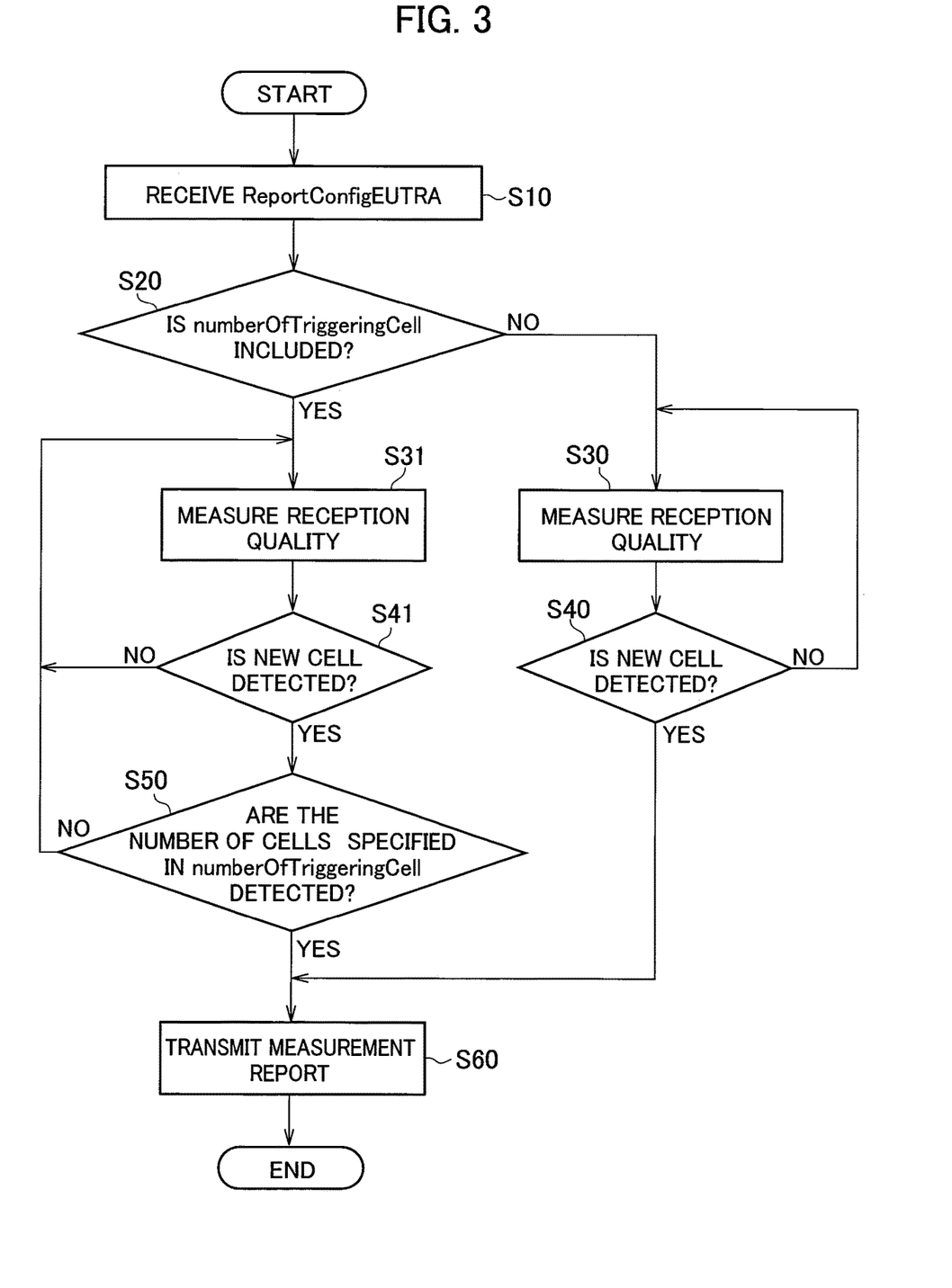
FIG. 3 is a diagram showing a flow of a measurement report transmission operation performed by the UE 200.
Figure 4:
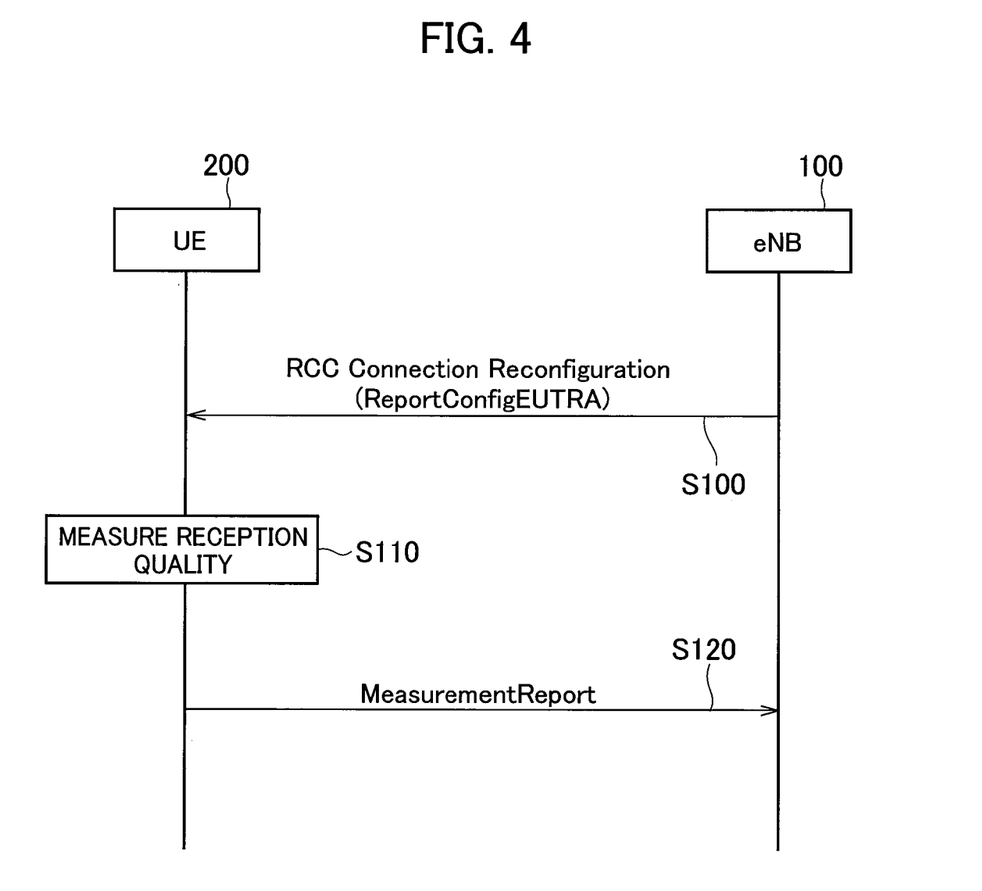
FIG. 4 is a diagram showing a communication sequence related to measurement report transmission between eNB 100 and the UE 200.

FIG. 3 shows a flow of the measurement report transmission operation performed by the UE 200. FIG. 4 shows a communication sequence related to measurement report transmission between the eNB 100 and the UE 200.

As shown in FIG. 3, the UE 200 receives the ReportConfigEUTRA (S10). Specifically, as shown in FIG. 4, the UE 200 receives the RRC Connection Reconfiguration that includes the ReportConfigEUTRA (S100).

Figure 5:
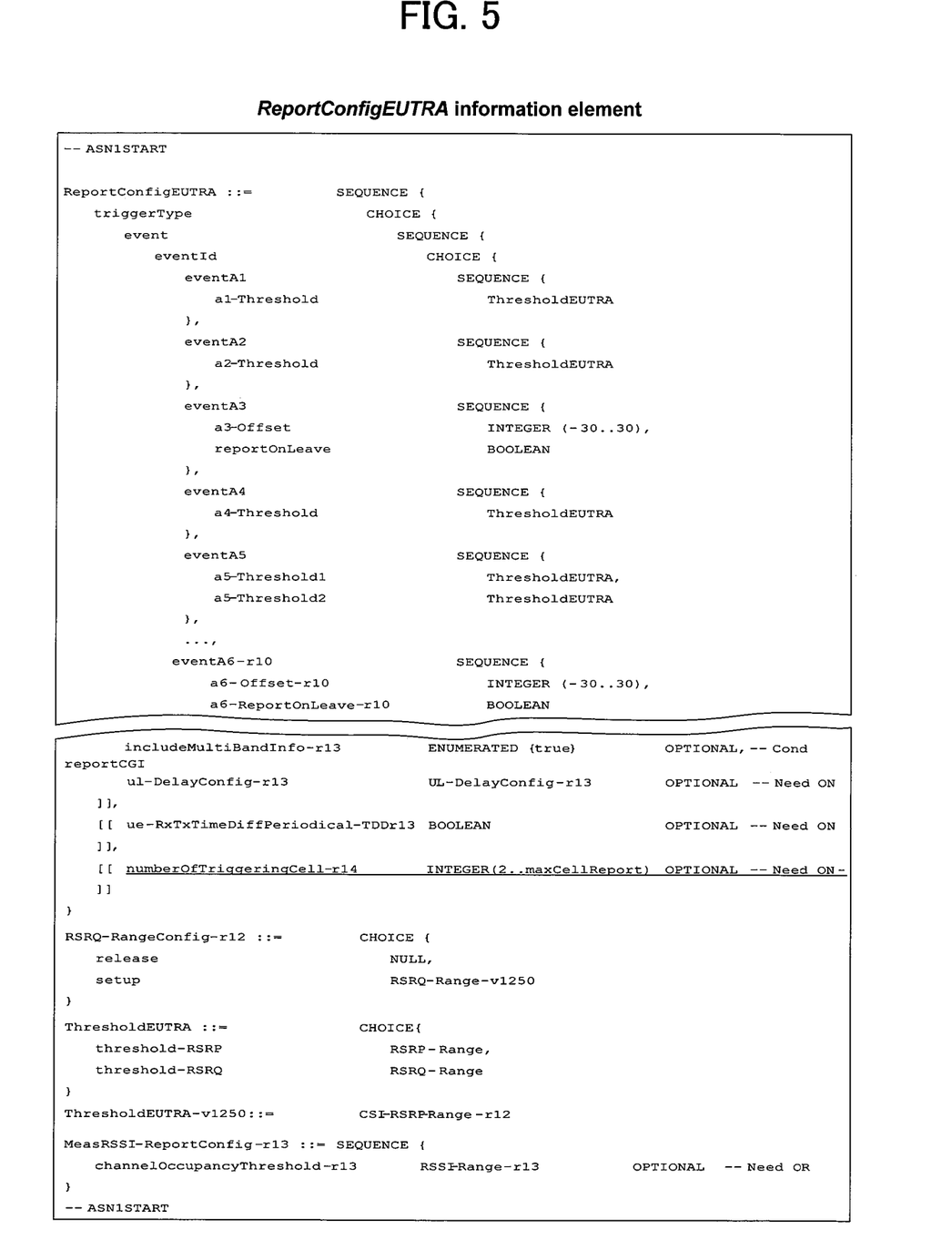
FIG. 5 is a diagram showing an example of ReportConfigEUTRA.

FIG. 5 shows an example of the ReportConfigEUTRA according to the present embodiment. In FIG. 6, an explanation of the ReportConfigEUTRA field (a part) is provided.

As shown in FIGS. 5 and 6, the numberOfTriggeringCell (refer to underlined parts in FIGS. 5 and 6) that indicates the number of the triggering cells is included in the ReportConfigEUTRA. The value of the numberOfTriggeringCell is stipulated as two or more, in other words, two or more neighbor cells. Moreover, the value of the numberOfTriggeringCell is set to a value smaller than the maxReportCells (the maximum number of cells that can be reported).

The UE 200 judges whether the numberOfTriggeringCell that indicates the number of the triggering cells is included in the ReportConfigEUTRA (S20).

When the numberOfTriggeringCell is not included, the UE 200 measures the reception quality of the serving cell and the neighbor cell according to the normal MeasConfig (S30 in FIG. 3, S110 in FIG. 4). The UE 200 judges whether a new cell that fulfills the entering condition (or the leaving condition) is detected (S40 in FIG. 3).

Even when the numberOfTriggeringCell is included, the UE 200 measures the reception quality of the serving cell and the reception quality of the neighbor cell in the same manner as that of when measured according to the normal MeasConfig (S31 in FIG. 3, S110 in FIG. 4). The UE 200 judges whether a new cell that fulfills the entering condition (or the leaving condition) is detected (S41 in FIG. 3). However, when the numberOfTriggeringCell is included, the UE 200 further judges whether the number of the new cells equivalent to the number of the triggering cells (for example, two cells or more) specified in the numberOfTriggeringCell are detected (S50).

The explanation on the entering conditions using the numberOfTriggeringCell provided in Chapter 5.5.4 of 3GPP TS36.331, for example, can be expressed as follows. In particular, the explanation provided under "3>" and "4>" is newly stipulated.

2> if the triggerType is set to event and if the entry condition applicable for this event, i.e.:

3> if the corresponding reportConfig includes numberOfTriggeringCell:

4> the event corresponding with the eventId of the corresponding reportConfig within VarMeasConfig, is fulfilled for the number of applicable cells indicated in numberOfTriggeringCell for all measurements after layer 3 filtering taken during timeToTrigger defined for this event within the VarMeasConfig, while the VarMeasReportList does not include an measurement reporting entry for this measId (a first cell triggers the event);

Moreover, the explanation on the leaving conditions using the numberOfTriggeringCell, for example, can be expressed as follows:

2> if the triggerType is set to event and if the leaving condition applicable for this event is fulfilled for the number of the cells indicated in numberOfTriggeringCell included in the cellsTriggeredList defined within the VarMeasReportList for this measId for all measurements after layer 3 filtering taken during timeToTrigger defined within the VarMeasConfig for this event:

When a new cell is detected, or the number of the new cells equivalent to the number of the triggering cells (for example, two cells or more) specified in the numberOfTriggeringCell are detected, the UE 200 transmits the measurement report (Measurement Report) to the radio access network 20, specifically, to the eNB 100 (S60 in FIG. 3, S120 in FIG. 4)

(4) Effects and Advantages

Figure 7:
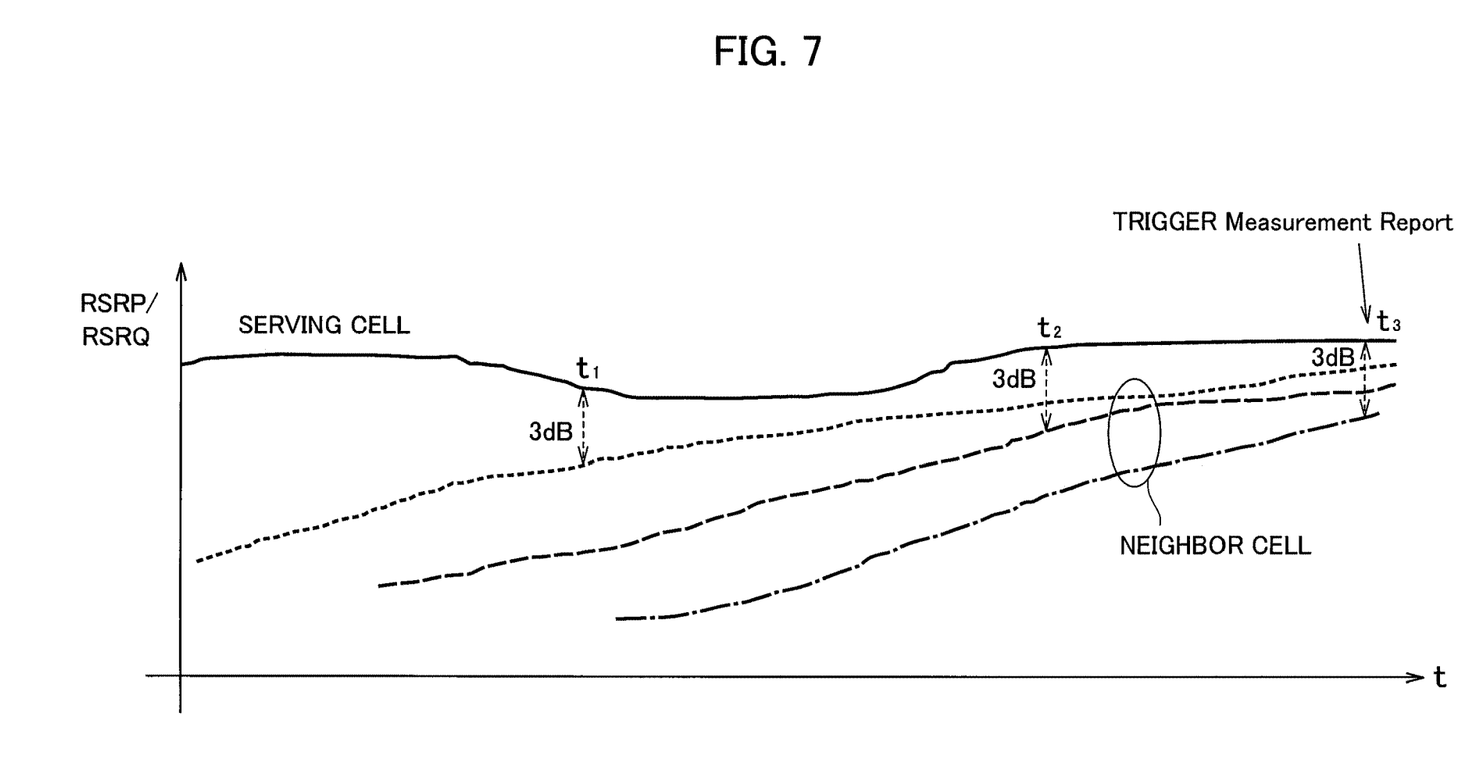
FIG. 7 is a diagram showing an example of transition of RSRP/RSRQ of a serving cell and a neighbor cell.

The following operational effects can be obtained with the embodiments explained above. FIG. 7 shows an example of transition of the RSRP/RSRQ of the serving cell and the neighbor cell.

In the example shown in FIG. 7, when a difference between RSRP/RSRQ level of the serving cell and RSRP/RSRQ level of the neighbor cell becomes 3 dB or less, the entering condition, that is, the condition for reporting the reception quality of a cell to the radio access network 20 is fulfilled, and the reception quality of that neighbor cell is reported.

In the normal Measurement Reporting, when the level difference between the RSRP/RSRQ of the serving cell and the RSRP/RSRQ of any of the neighbor cells becomes 3 dB or less, the UE 200 transmits the Measurement Report to the radio access network 20 (eNB 100) at respective timings (at t1, t2 in FIG. 7).

On the other hand, when the numberOfTriggeringCell explained above (in FIG. 7, an example in which the value is set to "3") is applied, at the timings t1 and t2, the Measurement Report is not transmitted, and at a timing (t3) at which corresponding level difference of three of the neighbor cells became 3 dB or less, the Measurement Report is transmitted by the UE 200.

In other words, when a plurality of the neighbor cells fulfills the entering condition/leaving condition of the event (A3, A5, and A6) at the same time, the UE 200 triggers the Measurement Report.

Accordingly, the number of the Measurement Reports transmitted by the UE 200 can be significantly reduced, and consumption of the radio resources can be suppressed. Particularly, similar to the UE 200 that is mounted on the drone 50, even when the unobstructed propagation environment is easily obtainable and the possibility of the reception quality of a large number of the neighbor cells fulfilling the entering condition is high, the number of the Measurement Reports can be reduced effectively.

Moreover, because the Measurement Report can be transmitted to the radio access network 20 at an appropriate timing according to the UE 200, similar to the UE 200 that is mounted on the drone 50, even when interference can be easily caused to the neighbor cells, the radio access network 20 can reliably implement interference preventive measures such as handover to another cell.

In the present embodiment, the numberOfTriggeringCell is applied to the entering condition and the leaving condition. Therefore, the number of the Measurement Reports can be reduced more effectively.

In the present embodiment, the numberOfTriggeringCell is determined based on the comparison between the reception quality of the serving cell and the reception quality of the neighbor cell, specifically, based on whether the entering condition based on the events (A3, A5, and A6) is fulfilled. Therefore, in the radio access network 20, it is possible to reduce the number of the Measurement Reports and reliably recognize the neighbor cells to which interference can be caused by a radio signal transmitted by the UE 200.

In the present embodiment, the numberOfTriggeringCell is set to a value smaller than the maxReportCells of the Measurement Report (the maximum number of cells that can be reported). Therefore, the mechanism of the existing Measurement Report can be used, and the number of the Measurement Reports can be reduced.

In the present embodiment, the UE 200 receives from the radio access network 20 the ReportConfigEUTRA (information element) that stipulates the transmission triggering condition of the Measurement Report, and the ReportConfigEUTRA includes the numberOfTriggeringCell. Therefore, the transmission frequency of the Measurement Reports can be controlled at the initiative of the radio access network 20.

(5) Other Embodiments

Although the contents of the present invention have been explained above by using the embodiments, it is obvious for a person skilled in the art that the present invention is not limited to those embodiments and that various modifications and improvements thereof are possible.

For example, in the embodiments explained above, the UE 200 is mounted on the drone 50; however, the UE is not necessarily mounted on a flying object such as the drone 50. That is, the present invention can be applied to a usual user device such as a smartphone.

Furthermore, the block diagram used for explaining the embodiments (FIG. 2) shows functional blocks. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 8:
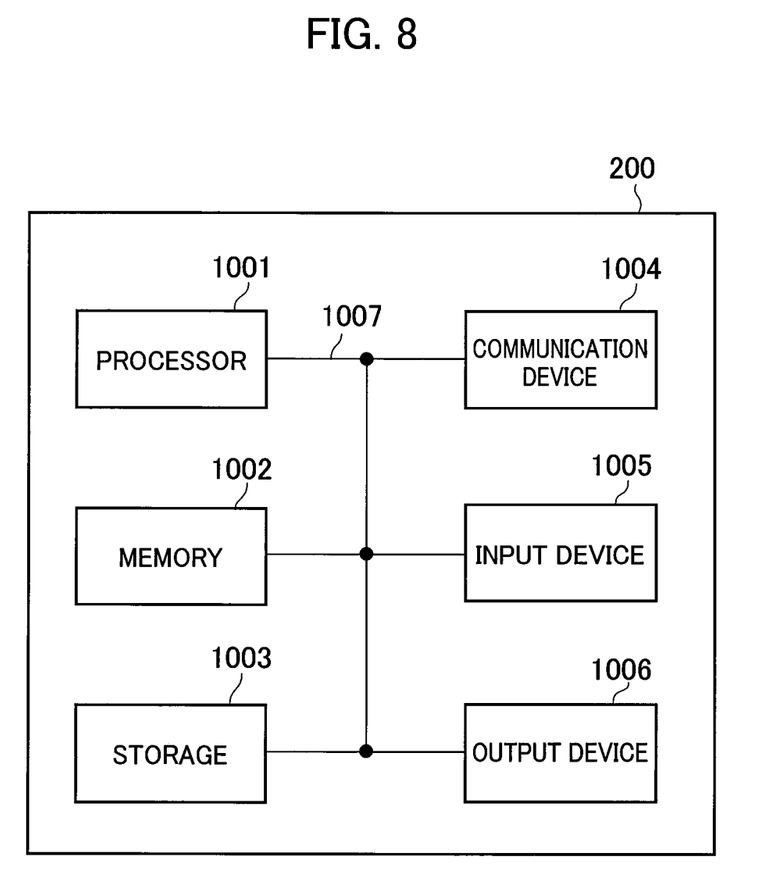
FIG. 8 is a diagram showing an example of a hardware configuration of the UE 200.

Furthermore, the UE 200 explained above can function as a computer that performs the processing of the measurement report transmitting method of the present invention. FIG. 8 is a diagram showing an example of a hardware configuration of the UE 200. As shown in FIG. 8, the UE 200 can be configured as a computer device including a processor 1001, a memory 1002, a storage 1003, a communication device 1004, an input device 1005, an output device 1006, and a bus 1007.

Furthermore, the functional blocks of the UE 200 (see FIG. 2) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes), software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)), other signals, or a combination thereof. In addition, the RRC signaling can be called an RRC message, and the RRC signaling can be, for example, an RRC Connection Setup message, an RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the eNB 100 can be performed by another network node (device). Moreover, functions of the eNB 100 can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index. [0070]. The eNB 100 (base station) can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably. The base station can also be referred to as a fixed station, Node B, eNode B (eNB), an access point, a femtocell, a small cell, and the like.

The UE 20 is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as a, an, and the in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be easily apparent to a person skilled in the art.

INDUSTRIAL APPLICABILITY

According to the present invention, even when the user device is mounted on a drone and the like, and an unobstructed propagation environment is easily obtainable, since it is possible to realize appropriate measurement reporting in which the consumption of radio resources is suppressed, it is useful.

EXPLANATION OF REFERENCE NUMERALS

10 radio communication system
20 radio access network
50 drone
100 eNB
110 reception quality measuring unit
120 cell count judging unit
130 measurement report transmitting unit
200 UE
C10, C21 to C26 cell
1001 processor
1002 memory
1003 storage
1004 communication device
1005 input device
1006 output device
1007 bus

The invention claimed is:

1. A user device comprising:
   a measuring device that measures reception quality of a serving cell and reception quality of a neighbor cell;
   a processor that judges whether a number of neighbor cells that fulfill an entering condition is equal to or more than a number-of-triggering-cells, which is the number required for report to be triggered; and
   a transmitter that transmits to a radio access network a measurement report including the reception quality when the processor judges that the number of the neighbor cells that fulfill the entering condition is equal to or more than the number-of-triggering-cells.

2. The user device as claimed in claim 1, wherein, when the number of the neighbor cells that fulfill a leaving condition for omitting the reception quality of a cell from the measurement report is equal to or more than the number of the triggering cells, the transmitter transmits the measurement report.

3. The user device as claimed in claim 1, wherein the number of the triggering cells is determined based on whether the entering condition based on a comparison between the reception quality of the serving cell and the reception quality of the neighbor cell is fulfilled.

4. The user device as claimed in claim 2, wherein, the number of the triggering cells is determined based on whether the leaving condition based on the comparison between the reception quality of the serving cell and the reception quality of the neighbor cell is fulfilled.

5. The user device as claimed in claim 1, wherein, the number of the triggering cells is set to a value smaller than the maximum number of cells that can be reported in the measurement report.

6. The user device as claimed in claim 1, wherein,
   the processor receives from the radio access network an information element that stipulates a condition for transmission triggering, and
   the information element includes the number of the triggering cells.

7. The user device as claimed in claim 2, wherein, the number of the triggering cells is set to a value smaller than the maximum number of cells that can be reported in the measurement report.

8. The user device as claimed in claim 2, wherein,
   the processor receives from the radio access network an information element that stipulates a condition for transmission triggering, and
   the information element includes the number of the triggering cells.

9. The user device as claimed in claim 3, wherein, the number of the triggering cells is set to a value smaller than the maximum number of cells that can be reported in the measurement report.

10. The user device as claimed in claim 3, wherein,
the processor receives from the radio access network an information element that stipulates a condition for transmission triggering, and
the information element includes the number of the triggering cells.

11. The user device as claimed in claim 4, wherein, the number of the triggering cells is set to a value smaller than the maximum number of cells that can be reported in the measurement report.

12. The user device as claimed in claim 4, wherein,
the processor receives from the radio access network an information element that stipulates a condition for transmission triggering, and
the information element includes the number of the triggering cells.

13. The user device as claimed in claim 5, wherein,
the processor receives from the radio access network an information element that stipulates a condition for transmission triggering, and
the information element includes the number of the triggering cells.

14. A measurement report transmitting method comprising:
measuring reception quality of a serving cell and reception quality of a neighbor cell;
judging whether a number of neighbor cells that fulfill an entering condition is equal to or more than a number-of-triggering-cells, which is the number required for report to be triggered; and
transmitting to a radio access network a measurement report including the reception quality when it is judged in the judging that the number of the neighbor cells that fulfill the entering condition is equal to or more than the number-of-triggering-cells.

* * * * *